March 20, 1945.  H. E. KÄMMEL  2,371,826
COUPLING DEVICE FOR TYPEWRITING CALCULATING MACHINES
Original Filed May 14, 1934   6 Sheets-Sheet 3

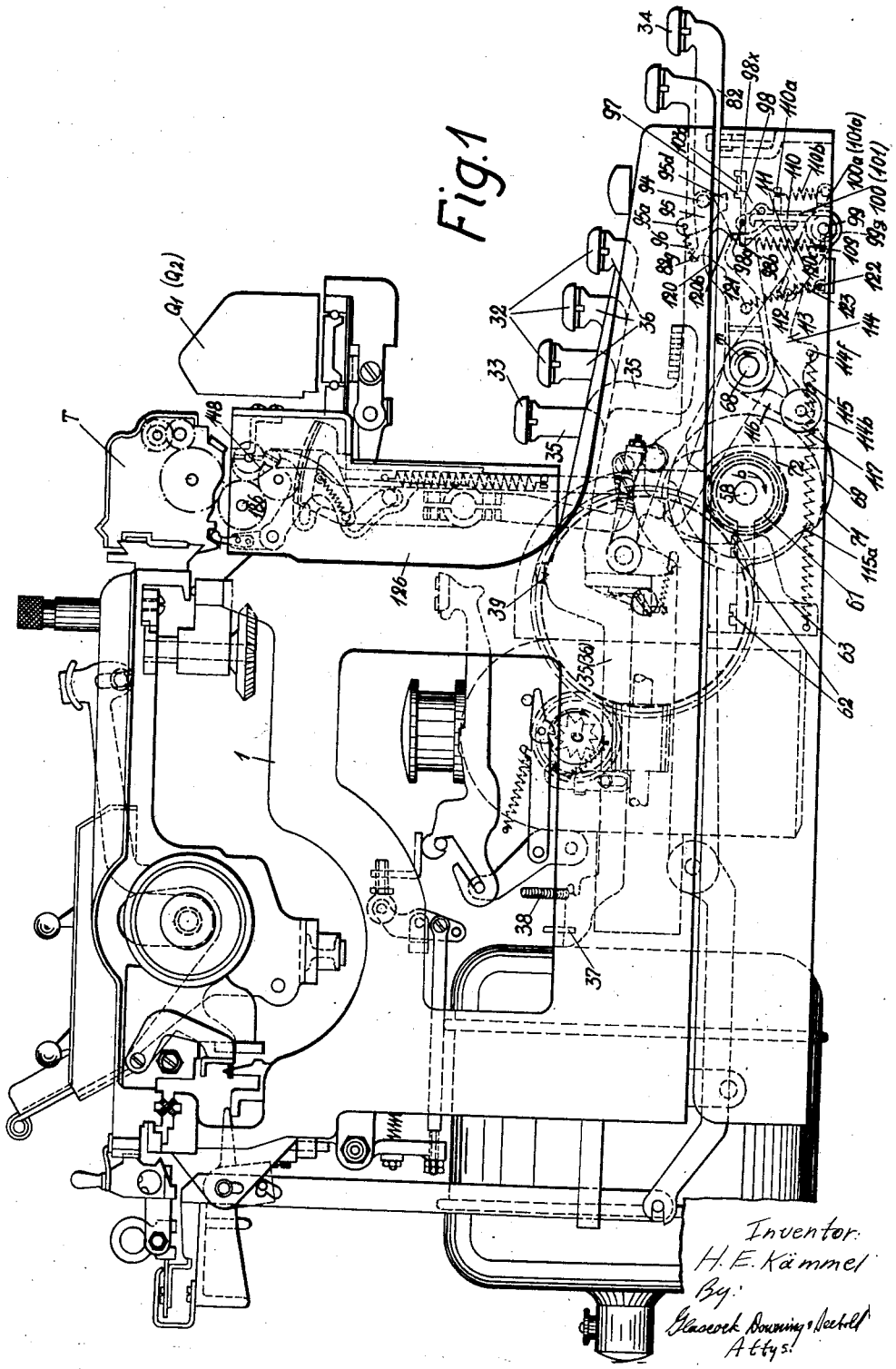

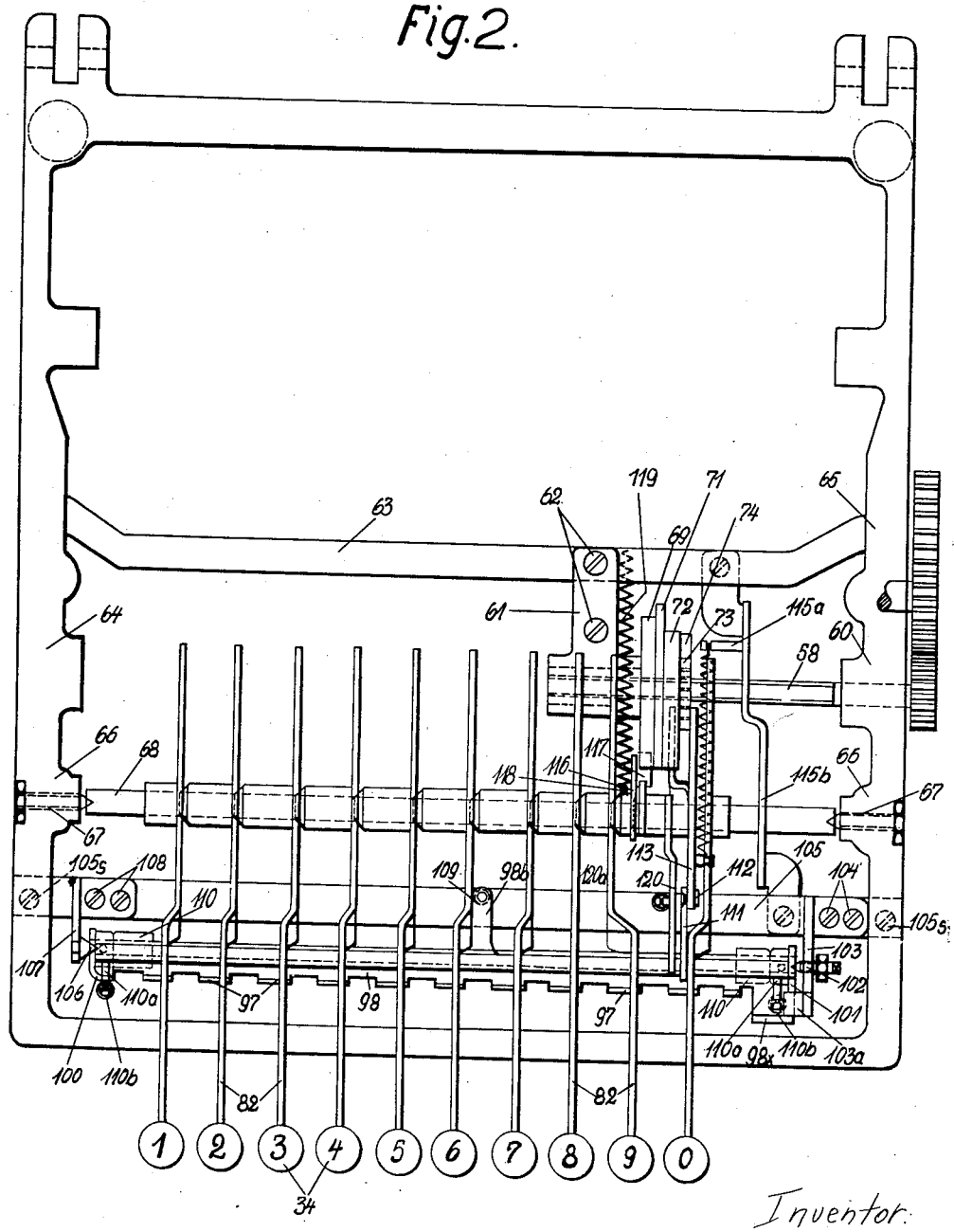

Inventor:
H. E. Kämmel
By:
Glascock Downing & Seebold
Attys.

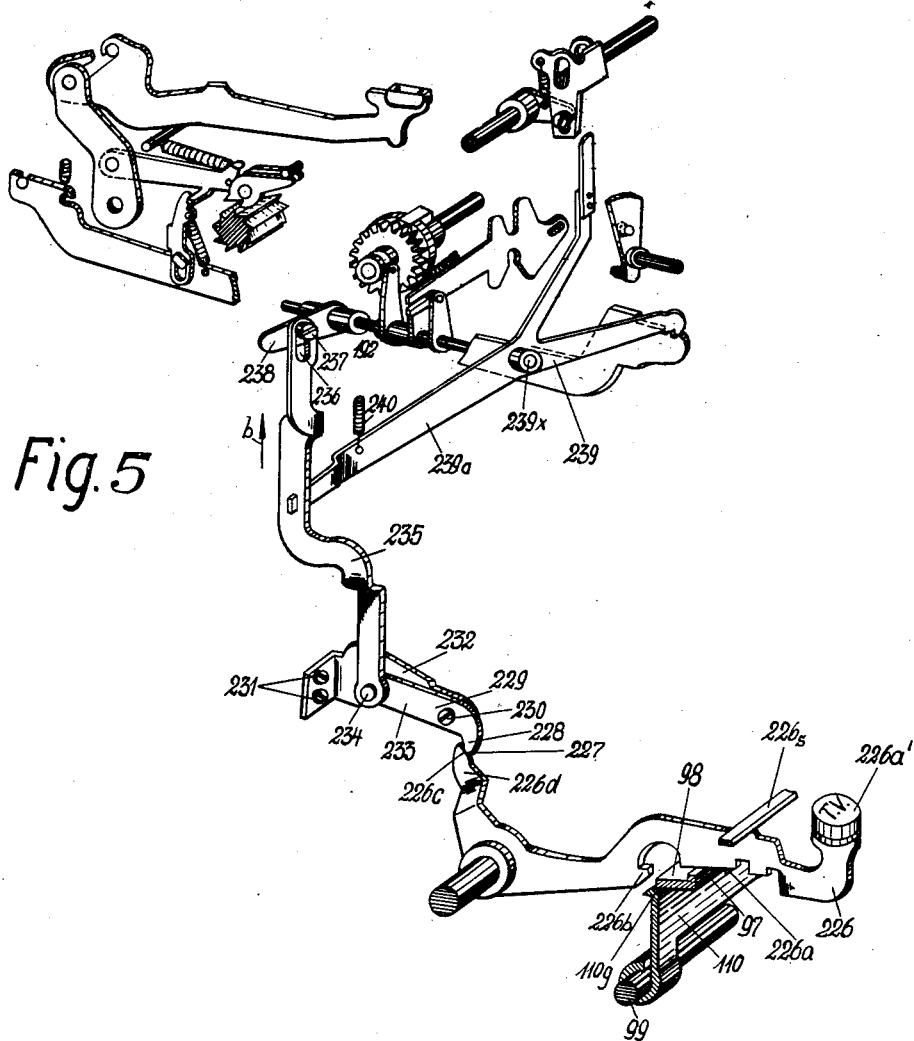

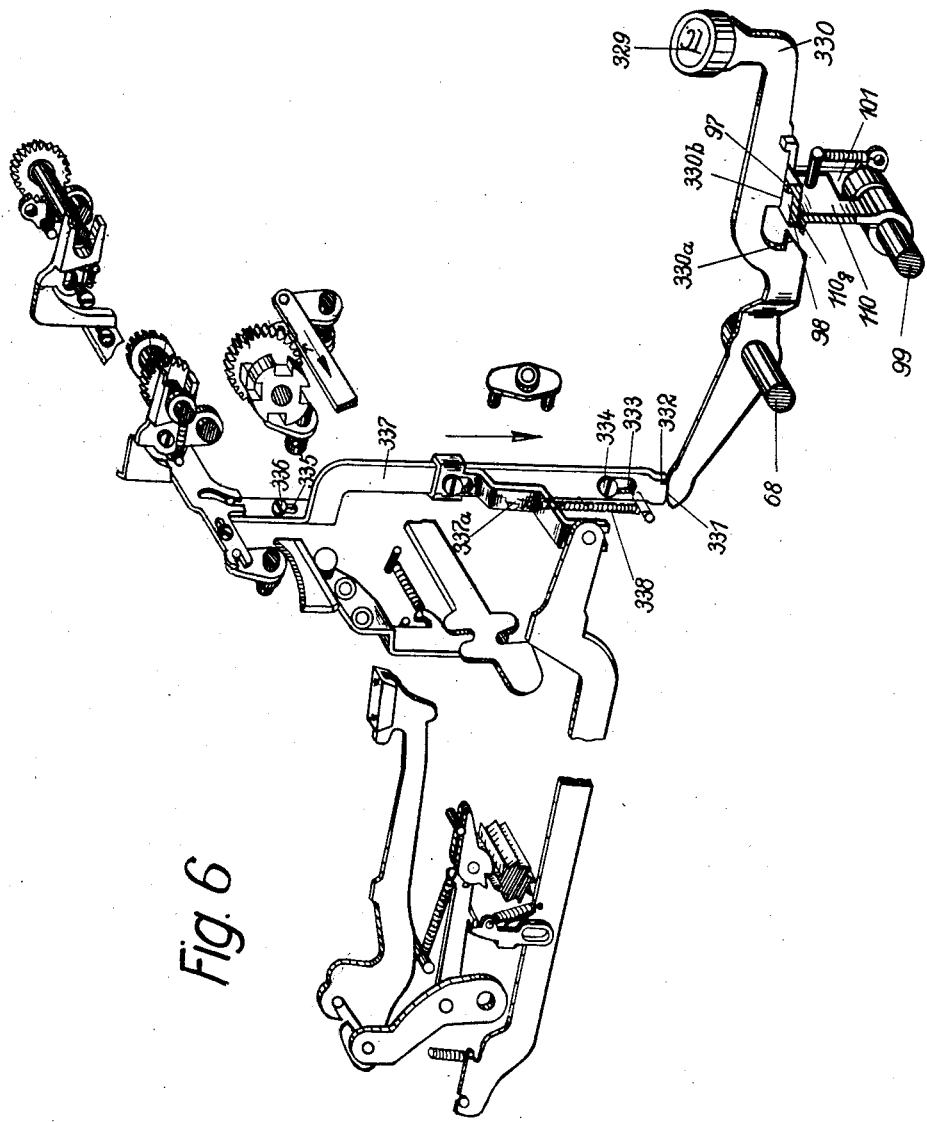

Patented Mar. 20, 1945

2,371,826

UNITED STATES PATENT OFFICE 2,371,826

COUPLING DEVICE FOR TYPEWRITING CALCULATING MACHINES

Hugo Ernst Kämmel, Zella-Mehlis, Germany; vested in the Alien Property Custodian Original application May 14, 1934, Serial No. 725,636. Divided and this application July 31, 1939, Serial No. 287,668. In Germany May 15, 1933

15 Claims. (Cl. 235—59)

The invention relates to a coupling device for typewriting calculating machines of the type exemplified in my co-pending application Ser. No. 725,636, filed May 14, 1934, now Patent 2,236,642, issued April 1, 1941, of which the present application is a division.

One object of this invention is the provision of novel means under control of the calculating keys, and the keys which condition the machine for taking totals of either the cross (grand) totalizers or the column totalizers, or both, to latch the selected key in depressed position until the completion of the operation initiated by such key, whether adding or total taking.

As a result, the invention is effective for periods of different lengths of time, the entry of a digit under control of a calculating key requiring much less time than the automatic printing of the total of a column or cross totalizer.

Another object is the provision of novel means common to the calculating and total conditioning keys to automatically effect the disconnection of the power from the actuating shaft of the machine at the conclusion of the particular kind of operation controlled by the selected key.

A still further object is the provision of novel means under control of the actuating shaft of the machine, to retain the key-latching mechanism in its effective position during the operation initiated by the selected key.

Still another object is the provision of a key-latching device common to the calculating and the total conditioning keys.

Finally, an object of the invention is to provide a novel combined key-latch and coupling control to enable and disable the coupling between the power and the actuating shaft.

Other objects and advantages will become apparent from the accompanying specification and claims read in connection with the drawings illustrating one embodiment of the invention, in which drawings Figure 1 shows a left-hand side elevation of the machine.

Figure 2 shows a plan of the sub-frame in which certain of the drive shafts are mounted together with the calculating keys and the drive coupling.

Figure 3 shows a perspective illustration viewed from the front left-hand side of the machine, of the drive coupling with the combined key latching and coupling controlling mechanism, common to all the calculating keys, in which view the individual parts for the sake of clearness are represented drawn out from one another.

Figures 4, 5:
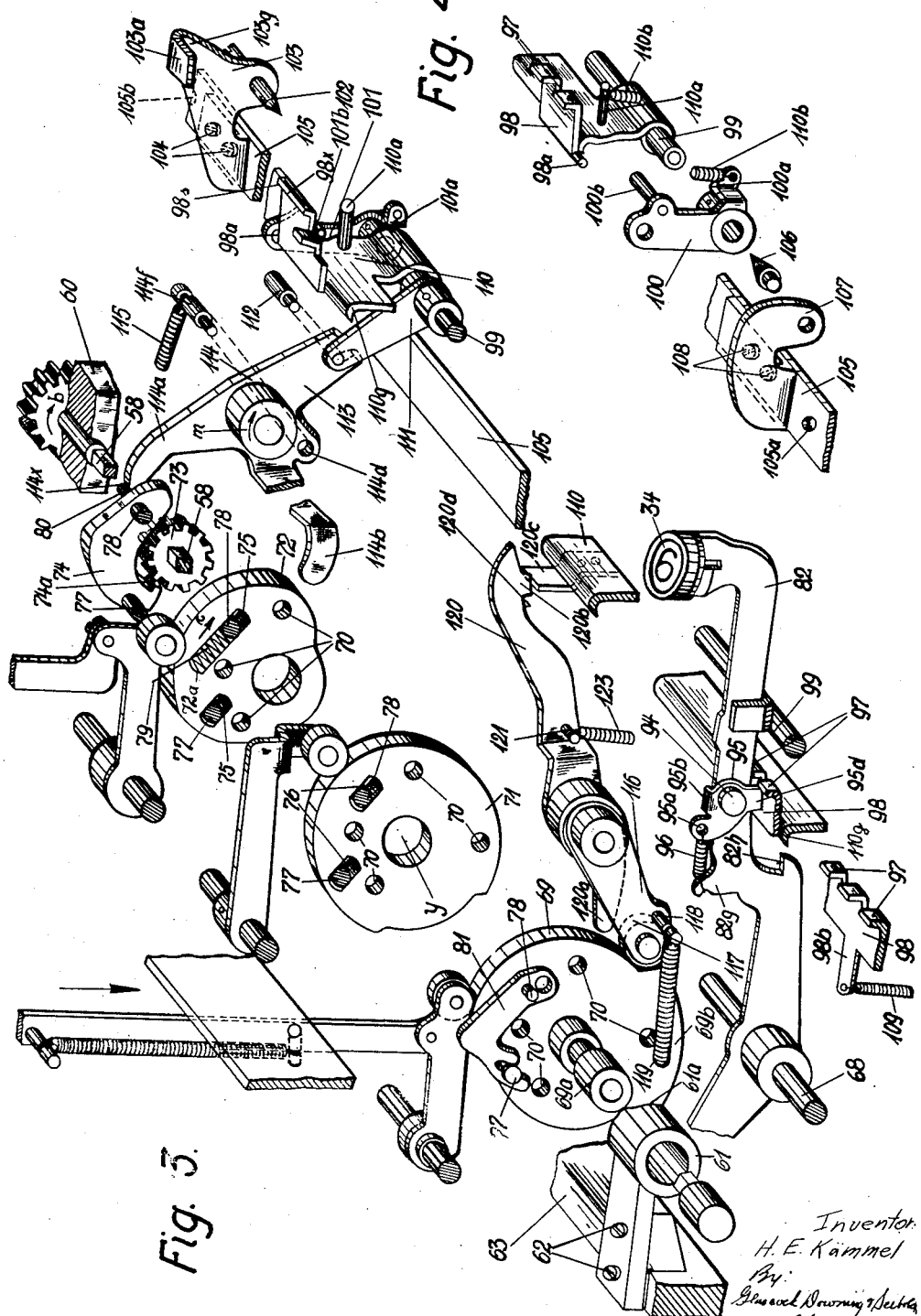
Figure 4 shows in perspective, details of the key latching and coupling controlling mechanism, the parts of which are likewise drawn out from one another.

Figure 5 shows a perspective illustration of a mechanism belonging to the means to condition the machine for taking totals from the column totalizers, viewed from the front left-hand side of the machine, together with a part of the change-over gear for the column totalizers and the total sign printing mechanism for the column totalizers, in which view the parts are illustrated partially drawn out from one another.

Figure 6 shows a perspective illustration of a mechanism belonging to the means to condition the machine for taking totals from the cross totalizers, with the printing mechanism for the sign in addition thereto, and a part of the change-over gear including both the driving wheels for the cross totalizers, the view being taken from the front left-hand side of the machine and various parts being illustrated drawn out from one another.

Figure 7:
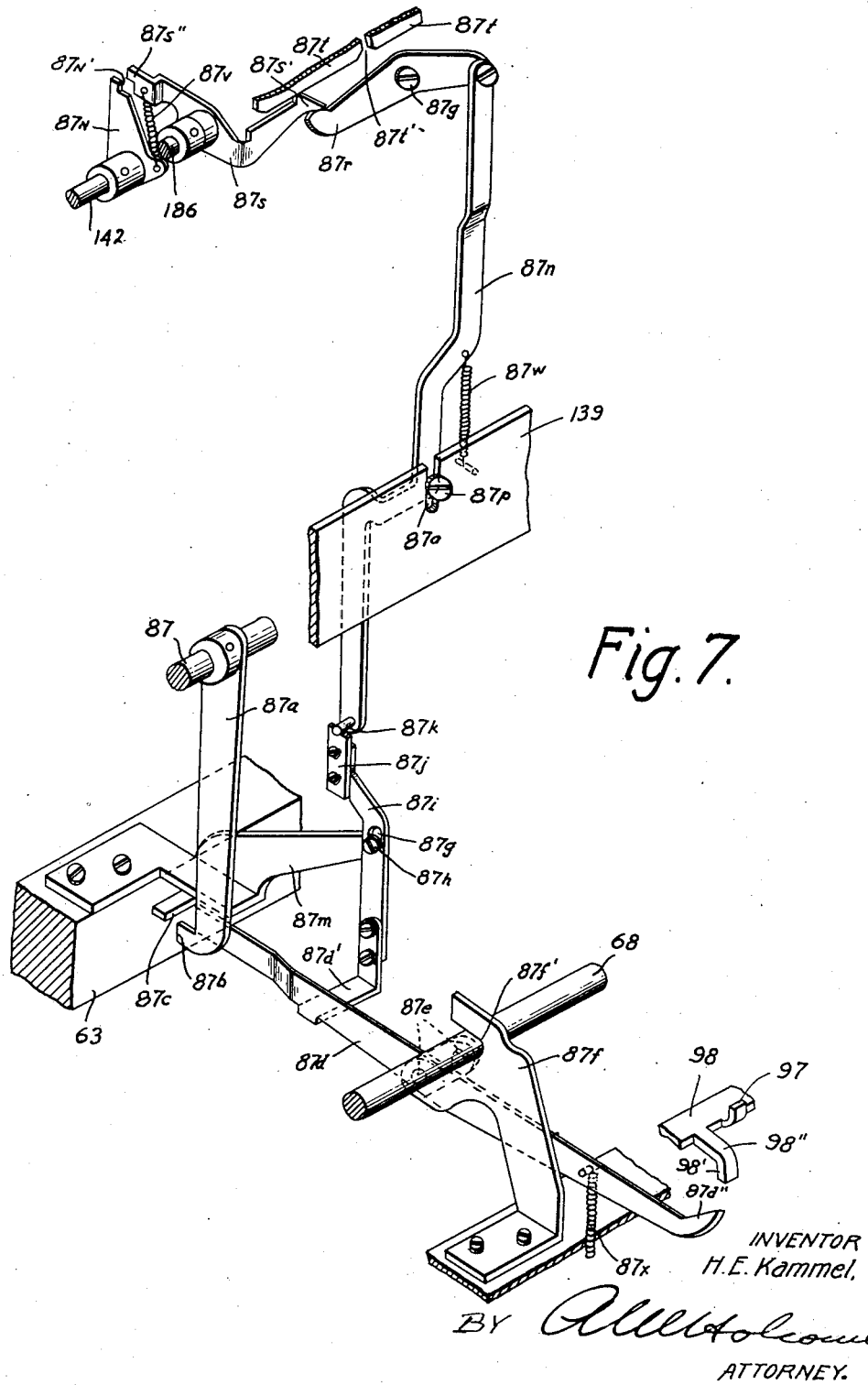

Fig. 7 is a fragmentary perspective view, showing the carriage-controlled means to effect the automatic release of the total keys at the end of a total printing operation.

The typewriting-accounting machine includes letter typing keys 32 (Fig. 1) with their key levers 36, numeral typing keys 33 with their levers 35, and calculating keys 34 with their key levers 82 (see Fig. 3).

The key levers 36 and 37 are fulcrumed on the bar 37 at the rear of the typewriting machine frame, and are held in and returned to normal positions by their springs 38, determined by the universal stop 39.

The calculating keys 34 are journaled on a cross rod 68, hereinafter referred to, mounted in the sub-frame 64, and operate the numeral typing keys indirectly in a manner constituting no part of the present invention.

The calculating mechanism drive 58 (Figures 1, 2 and 3) is rotatably mounted in the bearing 60, arranged in the right hand side of the machine housing 1, and at its inner end, the shaft 58 is rotatably mounted in a bearing 61, secured at 62, to a bridge 63 connecting the two side walls, 64 and 65. A fulcrum rod 68 (Figures 1, 2, 3, 5, and 6) is rigidly mounted by means of set screws 67, screwed into bosses 66 (Figure 2) on the left and right hand side walls 64 and 65 of the machine housing 1, and on this shaft, members to be hereinafter described, are swingably mounted.

In the bearing eye 61 (Figures 1 and 3), a cam 69, (Figure 1, 2, 3) is rotatably mounted by means of the sleeve 69a, rigidly fixed to the cam. The cam 69 is rigidly connected to the cams 71 and 72 by screws (not illustrated) which pass through holes 70 of the cams. The shaft 58, however, is not directly connected with the cams, since the cams 69, 71 and 72, as well as the sleeve 69a, have greater bores y (Fig. 3) than the diameter of the shaft 58. The cams 69, 71 and 72 are prevented from lateral displacement by contact of the side 69b of the cam 69 with the edge 61a of the bearing eye 61 and by contact of the cam 72 with the toothed wheel 73 non-rotatably mounted on the square shaft 58. The toothed wheel 73 participates in the rotation of the square shaft 58, which continually rotates in the arrow direction b (Fig. 3). On the cam 72, a pawl 74 (Figures 2 and 3) is displaceably arranged by means of pins 77 and 78, which engage in elongated slots 75 of the cam 72, in elongated slots 76, of the cam 71, and in elongated slots (not illustrated) in the cam 69. The pawl 74 is acted on continually in the direction of the arrow c (Figure 3) by a compression spring 79, which abuts against the pin 78 fixed to the pawl 74, and against the face 72a of the slot 75 in the cam 72. Moreover, a stud 80 formed on the pawl 74, co-acts with a part to be hereinafter described in detail, by means of which the tooth 74a of the pawl 74 is held out of engagement with the toothed wheel 73. In ring grooves (not illustrated) in the ends of the pins 77 and 78 of the pawl 74, which project from the left-hand side of the cam 69, a locking member 81 is fixed, in the manner illustrated in Figure 3, so that the pawl 74 always remains in connection with the cams 69, 71 and 72 and the pawl 74 is prevented from falling out. It may be remarked at this point that for the whole ten calculating keys 34, only one coupling as just described, is necessary.

Each calculating key lever 82 carries a pawl 95 pivoted thereto at 94 (Figures 1 and 3). With the nose 95a of this pawl, a spring 96 engages which is connected to a nose 82g arranged on the key lever 82 to rock the pawl anti-clockwise on its pivot 94. The normal position of the pawl 95 is determined by the contact of the right-angled bent nose 95b on the upper edge of the key lever 82. The downwardly directed end 95d of the pawl 95 is capable of co-acting with the right-angled upwardly-bent nose 97 of a detent bar 98. On the right and left hand ends of the bar 98, pintles 98a (Figures 3 and 4) are formed, one pin being arranged at each end. By means of these pintles, the detent bar 98 is swingably mounted on the levers 100 and 101, rigidly mounted on opposite ends of the shaft 99. The shaft, 99, at its right hand end, is rotatably mounted on a set screw 102 (Figure 3) passing through a bracket 103, secured to a cross bar 105 of the sub-frame 64, at 104. On the left-hand side of the machine, the shaft 99, is rotatably mounted by means of a cone bearing 106 (Figure 4) in a similar bracket 107 secured at 108 to the bar 105, already mentioned. The bar 105 is fixed to both side walls 64 and 65 of the machine housing 1, by screws 105s (Figure 2) which pass through holes 105a and 105b (Figures 3 and 4) of the bar 105.

By means of a spring 109, which engages with a lug 98b of the detent bar 98, and is connected to a pin 99g (Figure 1) rigidly fixed to the shaft 99, the detent bar 98 is rocked in the anti-clockwise direction around its pintles 98a journaled in the upper ends of the arms 100, 101 (Figs. 3 and 4), fast on shaft 99 so that its upper surface presses upwards against a laterally bent lug 103a on the bracket 103, whereby the normal position of the detent bar 98, is determined.

A key locking bar 110 (Figures 1, 3 and 4) is rotatably mounted by eyes formed near its opposite ends to encircle the shaft 99, in the manner indicated in Figures 3 and 4. At the right-hand and left-hand ends of the locking bar 110 forwardly projecting pins 110a are fixed, with each of which a spring 110b engages (in Figure 3 this has not been illustrated for the purpose of rendering other parts visible), which springs are connected to bent lugs 100a or 101a of the levers 100 and 101. By means of these springs 110b the locking bar is always acted upon round the shaft 99 in the clockwise direction, whereby its normal position is determined by contact with the laterally extending stop pin 100b, riveted to the lever 100 and by contact with the laterally extending stop pin 101b riveted to the lever 101. The right-angled flange 110g extending along the upper free edge of the key-locking bar 110, is capable of co-acting with the noses 82h (Figure 3) formed on the calculating key levers 82, in a manner to be hereinafter described.

On the shaft 99 (Figures 1, 3, 4) further, a rock arm 111 is rigidly mounted to the free end of which a pin 112 is riveted (in Figure 3 for the sake of illustration the same is indicated as disengaged from its arm). The pin 112 of the lever 111, co-acts with the fork-shaped end of an arm 113, of a clutch-control rocking lever 114, which is swingably mounted on the fulcrum rod 68. The arm 114a of the rocking clutch-control lever 114, co-acts with the stud 80, already mentioned, of the pawl 74, while the arm 114b, of the clutch control lever co-acts with the cam 72. A spring 115 engages with a pin 114f (in Figure 3, the pin 114f is shown removed from the lever 114 for purposes of illustration) riveted to the nose 114d (Fig. 3) of the clutch control lever 114, the spring at its other end being connected to a pin 115a (Figure 2) on a stay 115b, fixed to the subframe base 63 and to the cross stay 105. By means of this spring, the clutch control lever 114, is acted on in the clockwise direction round the shaft 68, in consequence of which the rock arm 111 connected to it, the shaft 99, and the levers 100 and 101 pinned to it, the locking flap 110, and finally the detent bar 98, are acted upon in the anti-clockwise direction, whereby the upper face of the lug 98x, under the action action of the spring 109, contacts the bottom face of the lateral lug 103a of the bracket 103, and the rear edge 98s of the lug 98x, under the action of the spring 115, contacts with the forward edge 103g of the lug 103a of the bracket 103, whereby the normal positions of the parts 114, 111, 99, 100, 101, 110 and 98, is determined.

Further, on the fulcrum rod 68, a lever 116 (Figures 1, 3) is swingably mounted, at the free end of which a roller 117 is arranged, capable of co-acting with the cam 69. By means of the spring 119, which, on the one hand, engages with the pin 118 of the lever 116, and on the other hand, is connected to the sub frame base 63, the roller 117, is always maintained in contact with the cam 69.

The lever 120, which similarly is swingably mounted on the fulcrum rod 68, is likewise capable of co-acting by means of its rearwardly directed arm, 120a (Figure 3) with the cam 69.

By means of the spring 123 which engages with the pin 121 and, on the other hand, is connected to a pin 122 (Figure 1) of the bridge 105, the lever 120, is acted on in the clockwise direction round the fulcrum rod 68, whereby the projection 120b of this lever contacts with a lip 120c, fixed to the key locking bar 110, and the normal position of the lever 120, 120a is thereby determined.

On the left-hand side of the machine is arranged the total key 226a' indicated by TV (Figure 5) for conditioning the machine for taking the individual totals of the column totalizers T. The key 226a' is attached to the key lever 226 (Figure 5), which is swingably mounted on the fulcrum rod 68. On the key lever 226 there is no pawl 95, as in the case of the calculating key levers 82 (Figure 3) in which the downwardly directed foot of the pawl acts on the bar 97, but the key lever 226 (Figure 5) is provided with a wide projection 226a, to engage the bar 97, 98. The nose 226b of the key lever 226 is capable of co-acting with the flange 110g of the key-locking bar 110. The rearwardly and somewhat upwardly projecting arm 226d of the key lever 226, is capable of acting with its somewhat arched face 226e on the somewhat arched face 227 of an arm 228 of an intermediate lever 229. The intermediate lever 229 is swingably mounted by means of a headed screw 230 on a supporting member 232, which is mounted by means of screws 231, in suitable manner on the machine housing. To the free rearwardly directed arm 233, of the intermediate lever 229, a draw-bar 235, formed correspondingly to that in Figure 5, is jointed by means of a screw 234, which draw-bar is provided with an elongated hole 236, in its free upwardly directed end. Through this hole a screw 237 projects, which is screwed into a lever 238, fixed on the shaft 192, whereby the draw-bar 235 is held loosely in connection with the lever 238. The draw-bar 235, is connected, in the manner illustrated in Figure 5, with a multiple-armed lever 239, which is swingably mounted in a suitable manner at 239x on the rear wall of the calculating mechanism 126 (Figure 1). With the arm 239a of the multiple armed lever 239, a spring 240 engages, which at its other free end is connected to a pin mounted in the calculating mechanism, but not illustrated. In consequence of the action of the spring 240, the draw-bar 235 is acted on in the direction of the arrow b, whereby its normal position is determined by striking of the key lever 226 against a universal key stop 226s arranged on the machine housing.

On the right-hand side of the machine, the key 329 for conditioning the machine for taking totals of the cross totalizers Q1 and Q2, is arranged. The key 329 is attached to the key lever 330 (Figure 6) swingably mounted on the fulcrum rod 68, the key lever being correspondingly formed to that illustrated in Figure 5. The nose 330a, of the key lever 330, is capable of co-acting with the nose 110g of the key-locking member 110, and the bearing edge 330b of the key lever 330 is capable of coacting with the detent bar 98. The rearwardly directed end of the key lever 330, is somewhat arched at 331, on its upwardly directed edge. This arched face 331, is capable of co-acting with an arched face 332, of a slide 337, vertically displaceable by means of the screw-slot connections 333, 334 and 335, 336, arranged in suitable manner on the right-hand side of the machine and the front wall of the housing. A spring 338 extending between a projection 337a fast on the slide 337, and to a pin 339 (Figure 6) on the frame of the machine, normally urges the slide 337 in the direction of the arrow a and holds the cross totalizer total conditioning key 329 in its elevated position. On depression of one of the calculating keys 34, the pawl 95 (Figures 1, 3) arranged on the key lever 82, acts on the right-angled upwardly bent nose 97, of the detent bar 98, mounted on the pins 98a (Figures 3 and 4) and swings the bar in the clockwise direction against the action of the spring 109. As a result, the edge 98s of the lug 98x (Figure 3) of the detent bar 98, slides from the edge 103g of the bracket, lug 103a, which is formed as a stop whereby the levers 100, 101 and rocking arm 111 rigidly mounted on the shaft 99, and further, the clutch control lever 114, mounted on the fulcrum rod 68, and in engagement with the rocking arm 111, by means of the pin-slot connection 112, can follow the pull of the spring 115.

On the swinging of the detent bar supporting levers 100, 101 with the detent bar 98 in the anti-clockwise direction, the nose 97 of the bar 98 which nose was engaged by the pawl 95 of the particular calculating key depressed, now slides rearwardly underneath the foot 95d of the pawl 95. The key locking bar 110, swingably arranged on the shaft 99, which, at its ends on account of the pull of the spring 110b, lies against pins 100b and 101b, respectively, of the detent bar supporting levers 100, 101, which pins rock the key-locking bar 110 counterclockwise due to the tension of spring 115 which rocks shaft 99 upon release of the detent bar 98 from engagement with the stop 103a. This movement of the locking bar 110 shifts the rearwardly directed locking flange 110g over a nose 82h (Figure 3) of the depressed key lever 82, and locks the same in the depressed position. Further, the lip 120c, fixed to the locking bar 110, participates in the swinging movement and slides along on the under edge of a latch lever 120 (Figure 3) swingably mounted on the fulcrum rod 68 and, in consequence of the pull of the spring 123, attached to the lever 120, is held in the recess 120d until after a revolution of the coupling including the cams 69, 71, 72, the lever 120, the lip 120c, as well as the key locking bar 110, are released again. A depressed calculating key lever, therefore, is not released again, owing to the locking means, 120c and 120d, until the corresponding value has been transferred. Further, simultaneous depression of two calculating keys 34, cannot take place owing to a roller lock (not illustrated). As already explained, on striking the calculating key 82, the system of levers 100, 101 and 111, attached to the shaft 99, as well as the multiple-armed clutch control lever 114, swingably mounted on the fulcrum rod 68, are released, whereby the latter lever under the pull of its spring 115, is swung in the direction of the arrow m (Figures 3 and 1). The nose 114x of the upwardly-directed arm 114a, of the lever 114, releases the member 80, of the pawl 74. The downwardly-directed arm 114b of the clutch control, on the other hand, has moved into the path of movement of the cam 72. Since the pawl 74 is displaceable in relation to the cam 72, by means of the pin-slot connection 75, 76, 77, 78, under the influence of the compression spring 79, and was locked by the nose 114x of the lever 114, the pawl 74 will follow in the arrow direction c under the pressure of the spring 79, to enter its tooth 74a into engagement with the toothed wheel 73, continually rotated, whereby all three cams 69, 71 and 72, are coupled with the toothed wheel 73, so that they participate in the rotational movement of the toothed wheel and in the arrow direction $b$ (Figures 1 and 3).

Now the cam 69 comes into operation at 162 degrees on the end 120a of the latch lever 120, whereby this lever is swung against the action of its spring 123. Consequently the nose 120b, of the latch lever 120, releases the lip 120c of the key locking bar 110, whereby this bar under the action of its spring 110b (Figure 4) tensioned by the previous return of the bar 98 into its rest position, likewise moves back into its rest position. Accordingly, the nose 82h (Figure 3) of the calculating key lever 82 is released, and the calculating key 82, 34 returns into the rest position, whereby the pawl 95, mounted on the calculating key lever 82, also rests again over its lug 97 of the bar 98.

Finally, as the clutch is completing its revolution, the nose 80 of the pawl 74, mounted on the coupling disc 72 (Fig. 3) contacts the nose 114x of the clutch control lever 114, already located in its rest position, whereby the pawl 74 is brought out of engagement against the action of its spring 79, with the wheel 73 of the continually rotating shaft 58. In order to prevent the cam series 69, 71, 72 from springing back at the moment when the pawl 74 is raised out of engagement with the toothed wheel 73, the roller 117 of the roller lever 116, snaps behind the high point of the cam 69 under the action of its strong spring 119, whereby the cam series 69, 71, 72 is held in the relative positions illustrated in Figure 3.

In order to withdraw an amount from any of the cross totalizers Q1 and Q2, and register it automatically in the corresponding column totalizer, it is necessary to depress the key 329 (TC) which conditions the machine to print totals from the cross-footers or cross-totalizers.

Upon depression of the key (TC) 329 (Fig. 6) the face 330b of the key lever 330 acts on the appropriate nose 97 of the rocking detent bar 98 and rocks the detent bar in the clockwise direction against the action of the spring 109 (Figure 3). In this movement the lug 98x (Figure 3) of the rocking detent bar 98, slides from the edge 103g of the bracket 103, which is formed as a stop, whereby the levers 100, 101, 111, rigidly mounted on the shaft 99 and the clutch control lever 114 mounted on the fulcrum rod 68 follow the pull of the spring 115.

By the resulting swinging movement of the clutch control lever 114 in the clockwise direction the pawl 74 is released to engage with the wheel 73, whereby the cams 72, 71, 69 participate in the rotation of the drive shaft 58 in the direction $b$. The depressed key 329 for conditioning the machine for taking totals of the cross totalizers Q1 and Q2 is thus held automatically in depressed position in the manner hereinafter described, until the cross totalizer Q1 is cleared, the pawl 74 remaining in engagement with the wheel 73 also for this period of repeated cycles of the machine.

After the shaft 58 and with it the cams 72, 71, 69 have commenced to rotate in the direction $b$ (Fig. 3) the cam 72 acts first on the de-clutching arm 114b of the clutch-control lever 114 and swings the same against the action of its spring 115 and in the opposite direction of the arrow $m$, whereby the parts 111, 99, 100, 101 and 98 are swung in the clockwise direction, while the locking bar 110 at this point is still held in its anti-clockwise position by the engagement of the recess 120d of the latch lever 120 with the lip 120c. In the swinging of the detent bar 98 in the clockwise direction, however, its nose 97 slides along on the projection 330b of the lever 330 of the key 329 whereby the lug 98x of the bar 98 cannot engage with the stop 103a of the bracket 103. Consequently, the parts 111, 100, 101, 98 (Figure 6) are not held at the end of their clockwise swinging movement but instead, on the continued rotation of the cam 72 yield to, the action of the tensioned springs 115 and 110b so that the clutch control lever 114, therefore, is swung again in the arrow direction $m$ and the parts 111, 100, 101, 98 are swung in the anti-clockwise direction, whereby the tension of the springs 115 and 110b is diminished.

When, shortly before the end of the first revolution of the cams 72, 71, 69, i. e., shortly before the termination of the calculating operation in the first or highest denomination, the latch lever 120 by the cooperation of its arm 120a with the projection 69b of the cam 69 is swung round the fulcrum rod 68 against the action of the spring 123, the co-acting latching members 120d and 120c are disengaged. Since, however, at this point the parts 111, 99, 100, 101 and 98 under the action of the spring 115 attached to the clutch control lever 114 are already swung again so far in the anti-clockwise direction that the pins 100b and 101b contact with the locking bar 110 which, up to this point has been held in key-locking position by the latch lever 120, the pins 100b and 101b in the counter-clockwise travel of the detent bar 98, hold the key-locking bar 110 effective until the nose 120b of the latch lever 120 snaps behind the lip 120c. By this time, according to the foregoing, the parts 114, 111, 100, 99, 101 and 98 have been brought back again into the working position by means of the spring 115, the nose 114x of the de-clutching arm 114a of the clutch control lever 114 has again moved out of operative relation to the nose 80 of the pawl 74, whereby the cam series 72, 71, 69 is not uncoupled after completion of its first revolution but commences a further revolution and consequently a new calculating operation.

This operation is repeated for each denomination of the cross totalizer Q1 so that, therefore, the key 329 in accordance with what has been said above, is held automatically depressed until the totalizer Q1 is cleared.

Upon the completion of the printing of a total, the machine is brought to rest as follows:

When the cross footer-totalizer Q1 and its associated column totalizer T arrive in their lowest decimal positions, and the units digit is printed, a carriage step occurs automatically, as in the printing of the digits of higher orders, which locates the cross footer and its column totalizer in their sub-units positions relatively to their respective master wheels 362 and 189.

This step of movement of the column totalizer shifts its cam blade 87t (Fig. 7) with which each column totalizer is provided, past the nose 87s' on the forward, laterally-offset arm of a locking lever 87s journaled on the column totalizer master wheel shaft 186, and urged in counter-clockwise direction by a spring 87v.

As the cam blade 87t escapes past the nose 87s' of the locking lever 87s, the locking lever is rocked counter-clockwise by its spring 87v to effective position, and its nose 87s' is projected upwardly into the space 87t' formed between the adjacent ends of the cam blades 87t of two adjacent column totalizers, or past the trailing end of the cam blade 87t of that totalizer associated with the cross totalizer, if there are no succeeding column registers.

The wiping engagement of the cam 87t with the nose 87s' of the locking lever 87s has caused the locking lever to maintain an intermediate lever 87r pivoted at 87q in its counter-clockwise position against the tension of a spring 87w, connected to a vertically shiftable bar 87n and to a stationary part 139 of the frame of the machine, the upper end of the shiftable bar being pivoted to the tail of the intermediate lever 87r.

The vertically shiftable bar 87n is guided by a stud 87p on the bar traversing a slot 87o in the part 139 of the machine frame, the lower end of the bar carrying a pin or projection 87k overhanging a wear plate 87j secured to the upper end of a slotted arm 87i.

The lower end of the slotted arm is fast to a lateral offset 87d' of a check lever 87d journaled on a pivot 87e supported by a bracket 87f mounted on a stationary part of the machine.

A second bracket 87m fastened to a cross bar 63 of the frame of the machine, carries a headed stud 87h passing through the slot 87g of the slotted arm 87i to guide the arm in its vertical movement.

The check lever 87d extends fore and aft of the machine, the upwardly inclined end 87d'' of the forward arm of the check lever normally lying idly below a horn 98' projecting from the rocking detent bar 98, the check lever being urged to its idle position by a spring 87x.

From the foregoing, it will be readily understood that upon the release of the intermediate lever 87r by the cam blade 87t and locking lever 87s, the spring 87w draws the vertically shiftable bar 87n downwardly, rocking the intermediate lever 87r clockwise, and forcing the projection 87k at the lower end of the shiftable bar against the wear plate 87j to thrust the sliding arm 87i downwardly and rock the check lever 87d counter-clockwise against the tension of its spring 87x.

The forward inclined end of the check lever 87d is thus pressed against the lower end of the horn 98'' due to the superior tension of spring 87w over spring 87x.

As the cam 72 rocks the clutch control lever 114 to de-clutching position and simultaneously rocks the shaft 99, supporting arms 100, 101 and the detent bar 98 clockwise, the horn 98'' escapes past the inclined forward end 87d'' of the check lever 87d which thereupon snaps upwardly into the return path of the horn to latch the detent bar 98 against return under the influence of the clutch-control lever spring 115.

The check lever 87d, by thus restraining the detent bar 98, is effective to retain the clutch control lever 114 is de-clutching position.

Thus, shortly prior to the completion of a rotation of the clutch, the cam 69 disengages the latch lever 120 from the lip 120c of the key-locking bar 110, whereupon the springs 110b which have been tensioned on the clockwise rocking of the detent bar 98, rock the key-locking bar clockwise to disengage its flange 110 from the depressed total key 329 which is then returned to its normal position by its spring 338 (Fig. 6).

The total key 329, as it returns, releases the detent bar 98 to the action of its spring 109 which thereupon rocks the detent bar counter-clockwise relatively to its supporting arms 100, 101 to position the nose 98x of the detent bar in front of and in contact with the edge 103g of the stop lug 103a of bracket 103.

Meanwhile, the clutch pawl 74 has contacted the rear end 114x of the clutch control lever 114, and has been disengaged from the ratchet wheel 73, and the machine comes to rest.

It will be understood that the check-lever 87d (Fig. 7) normally remains effective, and becomes ineffective only when the locking lever 87s is rocked by the engagement therewith of a cam blade 87t of a column register T.

Depression of the TV-key 226a' (Fig. 5) to condition the machine for taking totals from the column totalizers T, operates by way of the parts hereinbefore described, to release the pawl 74 (Fig. 3) for engagement with the toothed wheel 73, and the three cams 69, 71, 72, participate in the revolutions of the drive shaft 58. In this case, also the pawl 74, remains in engagement with the toothed wheel 73, as long as the key lever 226 is held depressed, since in consequence of the face 226a (Figure 5) of the key lever 226, the nose 114x (Figure 3) of the clutch control lever 114, cannot enter into the path of movement of the nose 80 of the pawl 74, and hence, the tooth 74a of the pawl is not disengaged from the toothed wheel 73.

At the termination of a total printing and clearing operation of a cross totalizer, the key 329 for conditioning the machine for taking totals from the cross footers or totalizers is released as heretofore explained.

I claim:

1. In a typewriting-calculating machine, the combination with calculating keys, and a power-driven clutch; of means to control the effectivity of the clutch, including a clutch control member to disconnect the clutch and shiftable to position to free the clutch for operation, a spring to shift the clutch control member to position to release the clutch for operation, a locking device common to the calculating keys for operation thereby, and connected with the clutch control member for movement therewith in one direction and return, and also relatively thereto in a different direction; and a stationary arresting element engageable by the locking device upon its movement in said different direction relatively to the clutch control member, to retain the clutch control member in position to disconnect the clutch, and to maintain the clutch disconnected against the tension of said spring.

2. In a typewriting-calculating machine, the combination with calculating keys; and a power-driven clutch; of means to control the effectivity of the clutch, including a clutch control member to disconnect the clutch and shiftable to position to release the clutch for operation, a spring to shift the clutch control member to position to release the clutch for operation, a locking device coupled with said clutch controlling member, and supported for movement therewith in one direction and return, and for movement relatively thereto in a different direction, a fixed arresting element engageable by the locking device upon its movement in said different direction relatively to the clutch control member to latch the locking element and the clutch control member in their effective positions, said locking device being shiftable, under control of any of the calculating keys, out of engagement with the fixed arresting element to enable said spring to shift the clutch control member to free the clutch for operation, and a normally idle key-locking device shiftable under control of said first named locking device into locking engagement with the depressed calculating key to hold said key in depressed position against premature return while the clutch-control member remains in its clutch-freeing position.

3. In a typewriting-calculating machine, the combination with calculating keys; and a power-driven clutch; of means control the effectivity of the clutch, including a clutch control member to disconnect the clutch and shiftable to position to release the clutch for operation, a spring to shift the clutch control member to position to release the clutch for operation, a locking device coupled with said clutch controlling member, and supported for movement therewith in one direction and return, and for movement relatively thereto in a different direction, a fixed arresting element engageable by the locking device upon its movement in said different direction relatively to the clutch control member to latch the locking element and the clutch control member in their effective positions, said locking device being shiftable, under control of any of the calculating keys, out of engagement with the fixed arresting element to enable said spring to shift the clutch control member to free the clutch for operation, a normally idle key-locking device shiftable under control of said first named locking device into locking engagement with the depressed calculating key to hold said key in depressed position against premature return while the clutch-control member remains in its clutch-freeing position, and spring link connections between the first-named locking device and the key-locking device tensioned by said first-named locking device as it returns towards its normal position, to restore the key-locking device to its home position to release the depressed calculating key.

4. In a typewriting-calculating machine, the combination with calculating keys; and a power-driven clutch; of means to control the effectivity of the clutch, including a clutch control member to disconnect the clutch and shiftable to position to release the clutch for operation, a spring to shift the clutch control member to position to release the clutch for operation, a locking device coupled with said clutch controlling member, and supported for movement therewith in one direction and return, and for movement relatively thereto in a different direction, a fixed arresting element engageable by the locking device upon its movement in said different direction relatively to the clutch control member to latch the locking element and the clutch control member in their effective positions, said locking device being shiftable out of latching engagement with the fixed arresting member to enable said spring to shift the clutch control member to free the clutch for operation, a one-way pawl on each calculating key engageable with said locking device upon depression of its key, to disengage the locking device from latching engagement with the fixed arresting element, said locking device, when shifted by said spring subsequently to such disengagement from its arresting element, operating to rock the one-way pawl of the depressed key to inoperative position; and means to restore said pawl to operative position as the depressed key restores to its normal position.

5. In a typewriting-calculating machine, the combination with a total key for conditioning the machine to print a total, and a power-driven clutch; of means to control the effectivity of the clutch including a clutch control member normally effective to maintain the clutch members disconnected, and shiftable to a position to free the clutch for operation, a spring to shift the clutch control member to position to release the clutch for operation, a normally latched locking device connected with the clutch control member for movement therewith and return, a fixed arresting element, means operable by the clutch to positively restore the clutch control member to effective position, and to restore its locking device to position to co-act with the fixed arresting element to latch the clutch control member in its effective position; means operable upon the locking device to effect the latching thereof and of the clutch control member in their respective effective positions at the completion of a single rotation, means on the total key which, upon depression of the total key, prevents latching of the locking device and its clutch control member in their effective positions; and means operable upon the locking device subsequently to the conclusion of the total printing operation, to retain the clutch control member in effective position notwithstanding the continued depression of the total key.

6. In a typewriting-calculating machine, the combination with calculating keys, and a power-driven clutch; of clutch control means, including a clutch control member shiftable to one or another position to enable coupling and uncoupling of the clutch, a spring to shift the clutch control member to position to enable coupling of the clutch, a locking device for the clutch control member operable by any of the calculating keys to release the clutch control member to the action of its spring, and supports for said locking device connected with the clutch control member to rock therewith, said locking device being pivotally mounted in said supports to rock relatively thereto in a direction substantially perpendicular to the direction in which the supports rock.

7. In a typewriting-calculating machine, the combination with calculating keys, and a power-driven clutch, of a clutch control mechanism for coupling and uncoupling the clutch, including a clutch control member shiftable to one position to enable a coupling operation and to another position to effect an uncoupling of the clutch, a locking device to maintain the clutch control member in position to effect uncoupling of the clutch, and operable by any of the calculating keys, a normally ineffective key-locking device to retain a depressed calculating key in operated position, and shiftable by said locking device to its effective and ineffective positions; and means operable by the clutch, when coupled, to restore the locking device to its effective position and the key-locking device to its ineffective position.

8. In a typewriting calculating machine, the combination with calculating keys, and a power-driven clutch; of a clutch control mechanism including a clutch control member, rocking supports connected with the clutch control member, a locking device mounted on said supports to retain the clutch control member in position to maintain the clutch disengaged, and releasable by the calculating keys, a key-locking device operable under control of said locking device to lock a depressed calculating key in operated position, clutch-controlled latching means to retain the key-locking device in its effective position and operative to release the key-locking device for return to idle position at the end of a single cycle of the clutch, and means operable prior to the release of the latching means to restore said locking device for the clutch control member notwithstanding the retention of the key-locking device in its effective position.

9. In a typewriting calculating machine, the combination with a power-driven clutch, and a total key; of means to control the effectivity of the clutch, including a clutch control member, a locking device normally latched to retain the clutch control member in clutch-disengaging position, and releasable by the total key to enable the clutch control member to free the clutch for operation, means to restore the clutch control member and its locking device to their effective positions at each clutch cycle, and means on the total key to prevent latching of the locking device in its effective position to enable continued cycling of the clutch.

10. In a typewriting calculating machine, the combination with calculating keys, and a power-driven clutch, of means to control the effectivity of the clutch, including a clutch control member, a locking device normally latched to retain the clutch control member in clutch-disengaging position, and releasable by the calculating keys to enable the clutch control member to free the clutch for operation, means to restore the clutch control member and its locking device to their effective positions at each clutch cycle, and means individual to the calculating keys and operable by the locking device as the clutch control member frees the clutch for operation, to render the depressed calculating key ineffective relatively to the locking device until the depressed key restores to normal.

11. In a typewriting-calculating machine, the combination with a traveling carriage, a power-driven clutch, and a total key; of means to control the effectivity of the clutch, including a clutch control member, a normally latched locking device to retain the clutch control member in clutch-disengaging position, means on the total key to release the locking device, upon depression of the total key, to enable the clutch control device to free the clutch for cycling, means to restore the clutch control member to position to effect disengagement of the clutch at each clutch cycle, said means on the total key rendering the locking device ineffective to retain the clutch control member in its clutch disengaging position, and carriage-controlled means operable at the end of a totaling operation, to detain the locking device and the clutch-control member in the positions to which they have been returned by said restoring means.

12. In a typewriting-calculating machine, the combination with a traveling carriage, a total key and a power-driven clutch; of clutch control mechanism including a clutch control member; a normally latched locking device effective to retain the clutch control member in clutch-disengaging position, means on the total key to release the locking device upon depression of the total key to enable the clutch control device to free the clutch for cycling, means to restore the clutch control member to position to effect disengagement of the clutch at each clutch cycle, said means on the total key rendering the locking device ineffective to retain the clutch control member in its clutch-disengaging position, whereby the clutch continues to cycle, a normally idle check means for the locking device, and carriage controlled means to shift the check means into the path of the locking device to retain said clutch control member in clutch-disengaging position at the end of a totaling operation.

13. In a typewriting-calculating machine, the combination with calculating keys, and a power driven clutch; of a clutch control member normally in clutch-disengaging position, a locking device normally effective to retain the clutch control member in clutch-disconnecting position, and releasable by the calculating keys, respectively, to free the clutch for cyclic operation, a normally idle key-locking device common to the calculating keys, to retain any of said keys depressed during the cycling of the clutch, means operable by the clutch at each cycle to restore the clutch-control member and its locking device to clutch-disengaging position, and means tensioned by said locking device on its return to normal clutch-disengaging position, to restore the key-locking device to its normal idle position.

14. In a typewriting-calculating machine, the combination with calculating keys, and a power driven clutch; of a clutch control member normally in clutch-disengaging position, a locking device normally effective to retain the clutch control member in clutch-disconnecting position, and releasable by the calculating keys, respectively, to free the clutch for cyclic operation, a normally idle key-locking device common to the calculating keys, to retain any of said keys depressed during the cycling of the clutch, means operable by the clutch at each cycle to restore the clutch control member and its locking device to clutch-disengaging position, clutch operated means to latch the key-locking device in its effective position, said clutch operated means effective subsequently to the operation of means for restoring the clutch-control member, to release the key-locking device for return to its idle position.

15. In a typewriting-calculating machine, the combination with calculating keys, and a power-driven clutch; of means to control the effectivity of the clutch, including a clutch control member shiftable to positions to enable coupling and uncoupling of the clutch, a spring to shift the clutch control member to position to enable coupling of the clutch for operation, locking means to normally latch the clutch control member against operation by said spring, and releasable by any of the calculating keys to free the clutch control member to the action of said spring, means to restore the locking means to effective position, and means individual to the respective calculating keys, and operable by the locking means upon its release by a depressed key to disable the control of the locking means by said depressed key, whereby to enable reestablishment and retention of the locking means in effective position notwithstanding continued depression of a calculating key.

HUGO ERNST KÄMMEL.